United States Patent
Kido et al.

(10) Patent No.: US 7,551,399 B2
(45) Date of Patent: Jun. 23, 2009

(54) HEAD SUSPENSION INCLUDING FLEXURE HAVING AS ELASTIC BENDING SECTION

(75) Inventors: Takuma Kido, Kawasaki (JP); Keiji Aruga, Kawasaki (JP); Shinji Koganezawa, Kawasaki (JP); Toru Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 11/283,729

(22) Filed: Nov. 22, 2005

(65) Prior Publication Data
US 2007/0019331 A1 Jan. 25, 2007

(30) Foreign Application Priority Data
Jul. 20, 2005 (JP) ............... 2005-209425

(51) Int. Cl.
*G11B 5/48* (2006.01)
(52) U.S. Cl. ................. 360/244.3
(58) Field of Classification Search ............ 360/234.3, 360/244.3
See application file for complete search history.

(56) References Cited

U.S. PATENT DOCUMENTS

| | | | | |
|---|---|---|---|---|
| 4,819,094 A | * | 4/1989 | Oberg | 360/245.9 |
| 5,187,625 A | * | 2/1993 | Blaeser et al. | 360/244.3 |
| 5,594,607 A | * | 1/1997 | Erpelding et al. | 360/244.3 |
| 6,483,670 B1 | | 11/2002 | Watanabe | 360/245.7 |
| 6,731,472 B2 | | 5/2004 | Okamoto et al. | 360/294.3 |
| 6,801,405 B2 | * | 10/2004 | Boutaghou et al. | 360/265.9 |
| 6,934,125 B2 | | 8/2005 | Takagi et al. | 360/244.8 |
| 2001/0008475 A1 | | 7/2001 | Takagi et al. | 360/244.8 |
| 2005/0235484 A1 | | 10/2005 | Takagi et al. | 29/603.03 |

FOREIGN PATENT DOCUMENTS

| | | |
|---|---|---|
| JP | 2001-143422 | 5/2001 |
| JP | 2001-155458 | 6/2001 |
| JP | 2002-050140 | 2/2002 |
| JP | 2003-336687 | 11/2003 |
| WO | WO 03/100289 | 12/2003 |

* cited by examiner

*Primary Examiner*—David D Davis
(74) *Attorney, Agent, or Firm*—Kratz, Quintos & Hanson, LLP

(57) ABSTRACT

A plate member is made of a metal material lighter than stainless steel in a suspension for a head slider. This leads to a reduction in the weight of the suspension. The natural frequency of the suspension is thus raised. Moreover, the viscoelastic member is interposed between the front surface of the plate member and the back surface of the flexure. This structure allows either the plate member or the flexure to act as a base and the other to act as a constraining member. In other words, the plate member, the flexure and the viscoelastic member in combination act as a so-called vibration damper including constraining layers. The viscoelastic member serves to further suppress vibration of the plate member and the flexure.

9 Claims, 6 Drawing Sheets

HEAD SUSPENSION INCLUDING FLEXURE HAVING AS ELASTIC BENDING SECTION

BACKGROUND OF THE INVENTION

1. Field of the Invention

The present invention relates to a suspension for a head slider, incorporated within a magnetic recording medium drive such as a hard disk drive (HDD), for example.

2. Description of the Prior Art

As disclosed in Japanese Patent Application Publication No. 2001-155458, a head suspension assembly includes a base plate and a load beam extending forward from the base plate. A flexure is received on the front surface of the load beam. The flexure includes a fixation plate fixed to the load beam and a support plate receiving a head slider on its front surface. A so-called gimbal spring is employed to connect the support plate to the fixation plate. The back surface of the support plate is received at a protrusion formed on the front surface of the load beam. Laser welding is employed to fix the fixation plate to the load beam, for example. The head suspension assembly is attached to the tip end of an actuator arm. The swinging movement of the actuator arm allows the head slider to be opposed to the surface of a magnetic recording disk.

The load beam is made of a metal material such as aluminum in the head suspension assembly of the type. This leads to reduction in the weight of the load beam in comparison with a load beam made of stainless steel. The natural frequency of the head suspension assembly is thus raised. However, when the magnetic recording disk is driven to rotate faster, the current of airflow generated along the surface of the magnetic recording disk further increases. Such airflow induces vibration of the head suspension assembly. Moreover, the increase in the current of the airflow causes the frequency of the vibration to approach the natural frequency of the head suspension assembly. This results in resonance induced in the head suspension assembly. The head slider is prevented from being positioned right above a target recording track on the magnetic recording disk. The electromagnetic transducer mounted on the head slider tends to fail in write and read operations.

SUMMARY OF THE INVENTION

It is accordingly an object of the present invention to provide a suspension for a head slider capable of effectively contributing to suppression of vibration induced in a head suspension assembly.

According to a first aspect of the present invention, there is provided a suspension for a head slider, comprising: a plate member made of a metal material lighter than stainless steel; a flexure fixed to the front surface of the plate member at the back surface of the flexure; and a viscoelastic member interposed between the front surface of the plate member and the back surface of the flexure.

The plate member is made of a metal material lighter than stainless steel in the suspension. This leads to a reduction in the weight of the suspension. The natural frequency of the suspension is thus raised. Moreover, the viscoelastic member is interposed between the front surface of the plate member and the back surface of the flexure. This structure allows either the plate member or the flexure to act as a base and the other to act as a constraining member. In other words, the plate member, the flexure and the viscoelastic member in combination act as a so-called vibration damper including constraining layers. The viscoelastic member serves to further suppress vibration of the plate member and the flexure.

The suspension may further comprise a plate piece standing from the back surface of the flexure, the plate piece extending along the front surface of the plate member. The plate piece is received on the back surface of the plate member at the tip end of the plate piece. Alternatively, the suspension may further comprise a plate piece standing from the front surface of the plate member, said plate piece extending along the front surface of the flexure. The plate piece is received on the front surface of the flexure at the tip end of the plate piece. These plate pieces serve to reliably avoid separation between the plate member and the viscoelastic member as well as the viscoelastic member and the flexure in the suspension. The suspension is thus reliably prevented from damages.

Ultrasonic bonding may be employed to bond the back surface of the flexure to the front surface of the plate member at a position outside the viscoelastic material in the suspension. Alternatively, welding may be employed to bond the back surface of the flexure to the front surface of the plat member at a position outside the viscoelastic material. The bonding or welding serves to avoid separation between the plate member and the viscoelastic member as well as the viscoelastic member and the flexure in the suspension. The suspension is thus reliably prevented from damages.

A metallic protection film may be formed on the plate member in the suspension. Alternatively, a carbon protection film may be formed on the plate member. The metallic protection film or the carbon protection film serves to enhance the hardness of the surface of the plate member. Abrasion can thus be avoided between the plate member and the flexure. Prevention of abrasion in this manner reliably avoids generation of dust.

A load tab made of stainless steel may be fixed to the tip end of the plate member in the suspension. As conventionally known, the load tab is received on a ramp member. Since stainless steel is employed for the load tab, abrasion can be avoided between the load tab and the ramp member. Prevention of abrasion in this manner reliably avoids generation of dust. On the other hand, a protrusion made of stainless steel is fixed to the front surface of the plate member so as to receive the back surface of the flexure. Since stainless steel is employed for the protrusion, abrasion can be avoided between the protrusion and the flexure. This reliably prevents generation of dust.

According to a second aspect of the present invention, there is provided a suspension for a head slider, comprising: a plate member made of a metal material lighter than stainless steel; a load tab extending forward from the tip end of the plate member; and two pieces of curved rib standing at joints of the load tab along a predetermined imaginary curved line.

The suspension of the type allows a reduction in its weight. The natural frequency of the suspension is consequently raised. This serves to suppress vibration of the plate member. Moreover, the load tab is received on the ramp member as described above. The load tab suffers from a larger load. Two pieces of curved rib are designed to stand along the predetermined imaginary curved line at the joints of the load tab. The curved ribs serve to provide a further rigidity of the load tab. The load tab is reliably prevented from suffering from damages. Drawing process may be employed to form the curved ribs. On the other hand, drawing process is hardly applied to a metal material such as stainless steel. If the stainless steel plate is subjected to drawing process, the plate itself suffers from limitation in the thickness while a resulting product suffers from limitation in the shape. These tend to result in an increase in the production cost.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
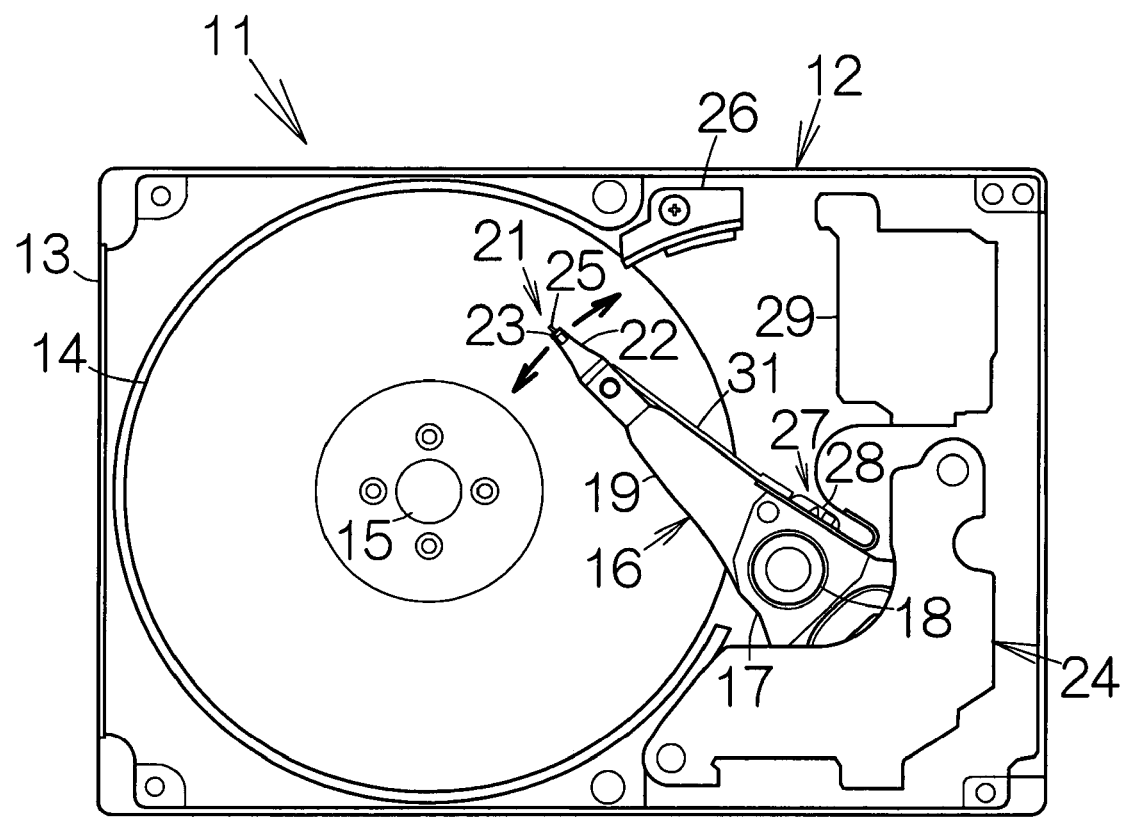
FIG. 1 is a plan view schematically illustrating the structure of a hard disk drive, HDD, as an example of a recording disk drive according to an embodiment of the present invention.

FIG. 1 schematically illustrates the inner structure of a hard disk drive, HDD, 11 as an example of a recording medium drive or storage device. The hard disk drive 11 includes a box-shaped enclosure 12. The enclosure 12 includes a boxed-shaped base 13 defining an inner space of a flat parallelepiped, for example. The base 13 may be made of a metal material such as aluminum, for example. Molding process may be employed to form the base 13. A cover, not shown, is coupled to the base 13. The cover closes the opening of the inner space within the base 13. Pressing process may be employed to form the cover out of a plate material, for example.

At least one magnetic recording disk 14 as a recording medium is incorporated within the inner space of the base 13. The magnetic recording disk or disks 14 is mounted on the driving shaft of a spindle motor 15. The spindle motor 15 drives the magnetic recording disk or disks 14 at a higher revolution speed such as 5,400 rpm, 7,200 rpm, 10,000 rpm, 15,000 rpm, or the like.

A head actuator 16 is also incorporated within the inner space of the base 13. The head actuator 16 includes an actuator block 17. The actuator block 17 is supported on a vertical support shaft 18 for relative rotation. Rigid actuator arms 19 are defined in the actuator block 17. The actuator arms 19 are designed to extend in a horizontal direction from the vertical support shaft 18. As conventionally known, in the case where two or more of the magnetic recording disks 14 are incorporated in the enclosure 12, a single one of the actuator arms 19 may be located between the adjacent magnetic recording disks 14. The actuator block 17 may be made of an aluminum alloy, for example. Extrusion molding process may be employed to form the actuator block 17.

A head suspension assembly 21 is attached to the tip end of the individual actuator arm 19 so as to further extend forward from the actuator arm 19. The head suspension assembly 21 includes a head suspension 22. The head suspension 22 extends forward from the front end of the actuator arm 19. A flying head slider 23 is fixed on the front end of the head suspension 22. The flying head slider 23 is designed to oppose a medium-opposed surface or bottom surface to the surface of the magnetic recording disk 14.

An electromagnetic transducer, not shown, is mounted on the flying head slider 23. The electromagnetic transducer may include a read element and a write element. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example. The write element may include a thin film magnetic head designed to write magnetic bit data into the magnetic recording disk 14 by utilizing a magnetic field induced at a thin film coil pattern.

The head suspension 22 serves to apply an urging force of a predetermined intensity to the flying head slider 23 in a direction toward the surface of the magnetic recording disk 14 as described later in detail. On the other hand, the flying head slider 23 is allowed to enjoy positive pressure or a lift based on airflow generated along the rotating magnetic recording disk 14. The airflow serves to generate positive pressure or a lift acting on the flying head slider 23. The flying head slider 23 is thus allowed to keep flying above the surface of the magnetic recording disk 14 during the rotation of the magnetic recording disk 14 at a higher stability established by the balance between the urging force of the head suspension 22 and the lift. As conventionally known, in the case where two or more of the magnetic recording disks 14 are incorporated within the enclosure 12, a pair of the head suspension assemblies 21 is attached to the tip end of the actuator arm 19 located between the adjacent magnetic recording disks 14.

A power source or voice coil motor, VCM, 24 is coupled to the actuator block 17. The voice coil motor 24 serves to drive the actuator block 17 for rotation around the vertical support shaft 18. The rotation of the actuator block 17 realizes the swinging movement of the actuator arms 19 and the head suspensions 22. When the actuator arm 19 is driven to swing around the vertical support shaft 18 during the flight of the flying head slider 23, the flying head slider 23 is allowed to move along the radial direction of the magnetic recording disk 14. The electromagnetic transducer on the flying head slider 23 can thus be positioned right above a target recording track on the magnetic recording disk 14.

A load member or load tab 25 is defined at the tip end of the individual head suspension 22. The load tab 25 extends forward from the tip end of the head suspension 22. The swinging movement of the head actuator 16 allows the load tab 25 to move along the radial direction of the magnetic recording disk 14. A ramp member 26 is located on the movement path of the load tab 25 in a space outside the magnetic recording disk 14. The ramp member 26 is designed to receive the load tab 25. The ramp member 26 may be screwed on the bottom plate of the base 13 at a position outside the magnetic recording disk 14, for example. The combination of the ramp member 26 and the load tab 25 establishes a so-called load/unload mechanism. The ramp member 26 may be made of an engineering or hard plastic, for example.

As is apparent from FIG. 1, a printed circuit board or flexible printed circuit board (FPC) unit 27 is located on the actuator block 17. A head IC (integrated circuit) or preamplifier IC 28 is mounted on a flexible printed circuit board of the flexible printed circuit board unit 27. The preamplifier IC 28 is designed to supply the read element with a sensing current when magnetic bit data is to be read. The preamplifier IC 28 is also designed to supply the write element with a writing current when magnetic bit data is to be written. A small-sized circuit board 29 is located within the inner space of the enclosure 12. A printed circuit board, not shown, is attached to the back surface of the bottom plate of the base 13. The preamplifier IC 28 on the flexible printed circuit board unit 27 is designed to receive the sensing and writing currents from the printed circuit board on the back surface of the bottom plate of the base 13 and the small-sized circuit board 29.

A flexible printed circuit board, FPC, 31 is utilized to supply the read and write elements with the sensing and writing currents output from the preamplifier IC 28, respectively. The flexible printed circuit board 31 is related to the individual flying head slider 23. The flexible printed circuit board 31 includes a metallic thin film such as stainless steel thin film. An insulating layer, an electrically-conductive layer and an insulating protection layer are in this sequence formed over the metallic thin film, for example. The electrically-conductive layer provides wiring patterns, not shown, extending over the flexible printed circuit board 31. The electrically-conductive layer may be made of an electrically-conductive material such as copper, for example. The insulating layer and the protection layer may be made of a resin material such as polyimide resin, for example.

The wiring patterns on the flexible printed circuit board 31 are connected to the flying head slider 23 at the front end of the flexible printed circuit board 31. An adhesive may be employed to attach the flexible printed circuit board 31 to the head suspension 22, for example. The flexible printed circuit board 31 extends backward along the side of the actuator arm 19 from the head suspension 22. The rear end of the flexible printed circuit board 31 is connected to the aforementioned flexible printed circuit board unit 27. The wiring patterns on the flexible printed circuit board 31 are connected to wiring patterns, not shown, of the flexible printed circuit board unit 27. The flying head slider 23 is in this manner electrically connected to the flexible printed circuit board unit 27.

Figure 2:
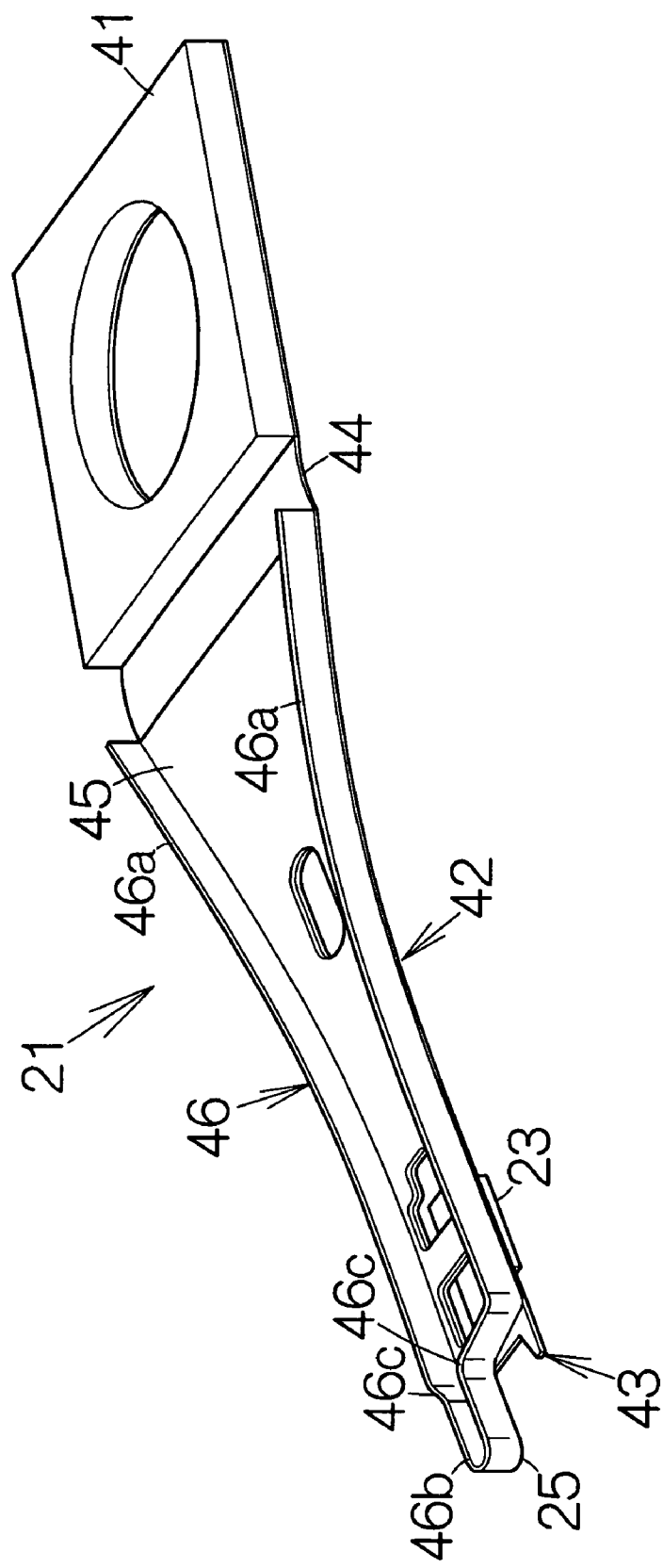
FIG. 2 is an enlarged perspective view schematically illustrating a head suspension assembly.

As shown in FIG. 2, the individual head suspension assembly 21 includes a base plate 41 and a plate member 42. The base plate 41 is attached to the tip end of the corresponding actuator arm 19. The plate member 42 is spaced forward from the base plate 41 at a predetermined distance. Caulking process may be employed to fix the base plate 41 to the actuator arm 19, for example. Both the base plate 41 and the plate member 42 are made of a metal material lighter than stainless steel, for example. The metal material may include aluminum, magnesium, or the like. Here, an aluminum alloy may be employed as the metal material, for example. Drawing process may be employed to form the plate member 42 out of a plate material, for example. Alternatively, the base plate 41 may be made of other metal material.

A flexure 43 is attached to both the front surfaces of the base plate 41 and the plate member 42. The flexure 43 defines an elastic bending section 44 between the front end of the base plate 41 and the rear end of the plate member 42. The base plate 41 and the plate member 42 are in this manner coupled to each other through the flexure 43. The flexure 43 may cover over the entire front surfaces of the base plate 41 and the plate member 42. The flying head slider 23 is fixed on the front surface of the flexure 43. The aforementioned flexible printed circuit board 31 is also attached to the front surface of the flexure 43. Here, the base plate 41, plate member 42 and the flexure 43 in combination establish the head suspension 22.

The plate member 42 comprises a main body 45 and the load tab 25 defined at the front end of the main body 45. The lateral dimension or width of the main body 45 is gradually reduced at a position closer to the front end away from the boundary to the elastic bending section 44. The plate member 42 defines a rib 46 standing from the outer periphery of the plate member 42. The rib 46 is set upright to the back surface of the plate member 42. The rib 46 defines a pair of first ribs 46a, 46a and a second rib 46b. The first ribs 46a, 46a respectively extend along the outer periphery of the main body 45. The second rib 46b extends along the outer periphery of the load tab 25. A curved rib 46c is defined between the first rib 46a and each of the second ribs 46b. The curved ribs 46c stand from the joints of the load tab 25 along a predetermined imaginary curved line.

Figure 3:
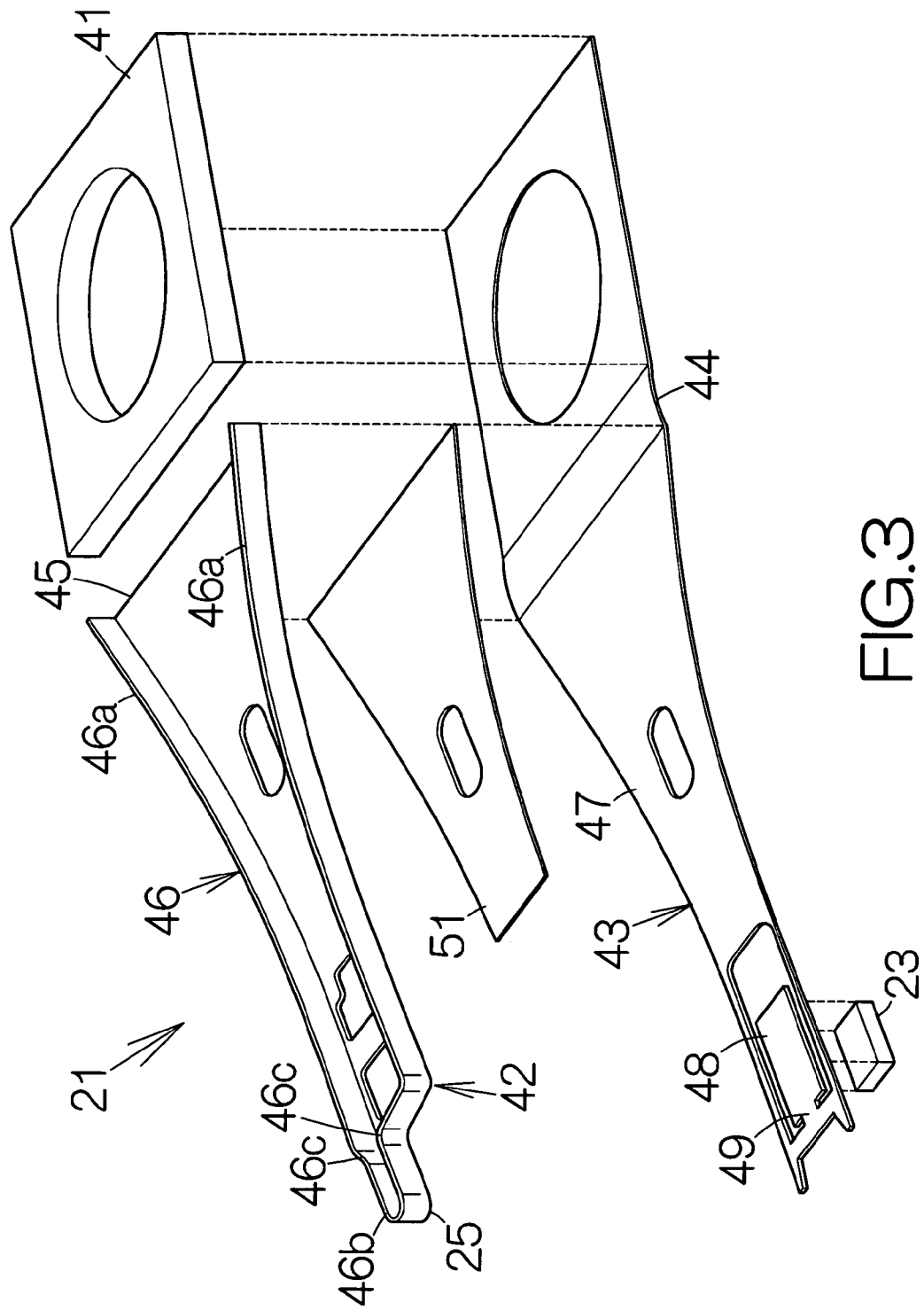
FIG. 3 is an enlarged exploded view schematically illustrating the structure of the head suspension assembly.

As shown in FIG. 3, the flexure 43 defines a support plate 47 and a receiving plate 48. The support plate 47 is fixed to both the front surfaces of the base plate 41 and the plate member 42. The receiving plate 48 receives the flying head slider 23 on its front surface. The support plate 47 includes the elastic bending section 44. The flying head slider 23 may be bonded to the front surface of the receiving plate 48. A so-called gimbal spring 49 is employed to connect the receiving plate 48 to the support plate 47. The support plate 47, the receiving plate 48 and the gimbal spring 49 may be made of a single resilient plate. The resilient plate may be a stainless steel plate having a constant thickness, for example.

A viscoelastic member 51 is interposed between the front surface of the plate member 42 and the back surface of the flexure 43 for fixing the flexure 43 to the plate member 42. The viscoelastic member 51 is positioned on the flexure 43 at a position between the front end of the elastic bending section 44 and the receiving plate 48. Here, a double-sided adhesive tape may be employed as the viscoelastic member 51, for example. The double-sided adhesive tape may include a thin film and adhesive layers respectively superposed on the front and back surfaces of the thin film. A viscoelastic material, VEM, may be utilized for forming the thin film, for example.

Figure 4:
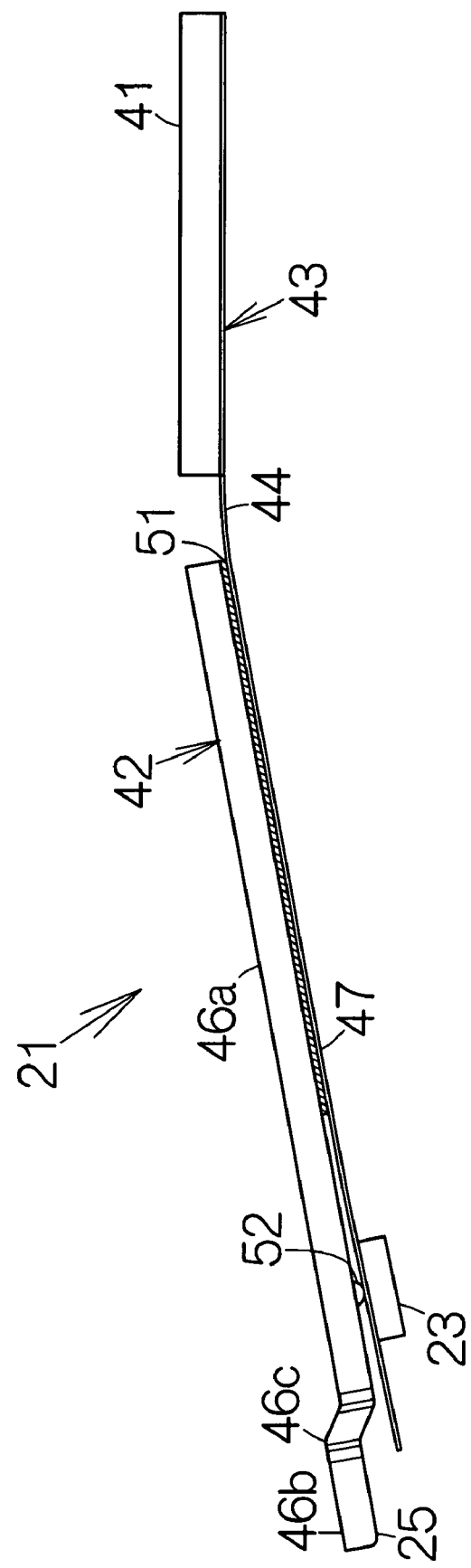
FIG. 4 is a side view of the head suspension assembly.

Referring also to FIG. 4, the elastic bending section 44 of the flexure 43 bends in its original shape. The elastic bending section 44 thus establishes a predetermined inclination angle between an imaginary plane including the front surface of the base plate 41 and an imaginary plane including the front surface of the plate member 42. The plate member 42 gets closer to the surface of the magnetic recording disk 14 at a location remoter from the base plate 41. When the flexure 43 is fixed to the surface of the plate member 42 with the viscoelastic member 51 interposed therebetween, the back surface of the receiving plate 48 is received on a domed protrusion 52 formed on the front surface of the plate member 42.

The elastic bending section 44 of the flexure 43 is designed to exhibit elastic or bending force of a predetermined intensity based on own elasticity in the head suspension assembly 21. This bending force serves to establish an urging force applied to the front end of the plate member 42 toward the surface of the magnetic recording disk 14. The domed protrusion 52 is abutted against the back of the receiving plate 48 so as to transmit the urging force to the flying head slider 23. Airflow generated along the surface of the magnetic recording disk 14 serves to change the distribution of a lift on the flying head slider 23. The domed protrusion 52 serves to allow a change in the attitude of the flying head slider 23 or the receiving plate 48 in response to a change in the lift.

Both the base plate 41 and the plate member 42 are made of a metal material lighter than stainless steel in the head suspension assembly 21. The weight of the head suspension 22 is thus reduced. The plate member 42 made of an aluminum alloy, for example, allows the head suspension assembly 21 between the front end of the support plate 47 and the front end of the elastic bending section 44 to have half the mass of that including the support plate made of stainless steel. The head suspension 22 is thus allowed to enjoy a higher natural frequency. The head suspension assembly 21 is also allowed to enjoy a reduction in the moment of inertia as described later in detail. The electromagnetic transducer on the flying head slider 23 can thus be positioned right above a target recording track on the magnetic recording disk 14 in a shorter period. The reduced mass of the head suspension assembly 21 enables an improvement in the shock resistance of the head suspension assembly 21 as described later in detail.

The viscoelastic member 51 is interposed between the front surface of the plate member 42 and the back surface of the flexure 43. This structure allows either the plate member 42 or the flexure 43 to act as a base and the other to act as a constraining member. In other words, the plate member 42, the flexure 43 and the viscoelastic member 51 in combination act as a so-called vibration damper including constraining layers. Even if the current of the airflow gets faster along the surface of the rotating magnetic recording disk 14, the viscoelastic member 51 serves to suppress vibration of the plate member 42 and the flexure 43. The electromagnetic transducer on the flying head slider 23 can thus be positioned right above a target recording track on the magnetic recording disk 14 with a higher accuracy. The electromagnetic transducer is thus allowed to complete its write and read operations with a higher accuracy.

The load tab 25 is received on the ramp member 26 in the load/unload mechanism when the magnetic recording disk 14 stands still. The urging force of the head suspension 22 acts on the load tab 25. The load tab 25 suffers from a larger load at the joints to the main body 45. The rib 46 is formed on the load tab 25, namely the plate member 42. In particular, two pieces of curved rib 46c, 46c by drawing process extend along predetermined imaginary curved lines at the joints of the load tab 25. The curved ribs 46c serve to provide a further rigidity of the load tab 25. The load tab 25 is reliably prevented from suffering from damages. Drawing process is hardly applied to a metal material such as stainless steel, for example. If the stainless steel plate is subjected to drawing process, the plate itself suffers from limitation in the thickness while a resulting product suffers from limitation in the shape. These tend to result in an increase in the production cost.

Here, the mass of an aluminum alloy is set at approximately one third the mass of stainless steel. The thickness of the base plate 41 and the plate member 42 are set at approximately one and a half times the thickness of a base plate and a plate member made of stainless steel in view of establishment of a sufficient rigidity. The base plate 41 and the plate member 42 are allowed to have a mass approximately half the mass of the base plate and the plate member made of stainless steel. The base plate 41 and the plate member 42 are still allowed to have a rigidity equivalent to that of the base plate and the plate member made of stainless steel. The moment of inertia of the head actuator 16 is thus allowed to enjoy a 15% or more reduction from that of a conventional head actuator. The electromagnetic transducer on the flying head slider 23 can be positioned right above a target recording track on the magnetic recording disk 14 in a shorter period.

Next, the present inventors have measured the natural frequencies of the head suspension 22 made of an aluminum alloy and a head suspension made of stainless steel for comparison. It has been confirmed that the natural frequency of the head suspension 22 made of an aluminum alloy is increased by approximately 20% to 50% of the natural frequency of the head suspension made of stainless steel. The natural frequencies have been measured based on the finite element method, FEM.

Next, the present inventors have observed the shock resistance of the head suspension assembly 21 based on software-based simulation. The head suspension assembly 21 is made of an aluminum alloy according to a specific example of the present invention. Here, the separation acceleration of the head suspension assembly 21 is compared with that of a head suspension assembly made of stainless steel. The separation acceleration represents an impact having the minimum acceleration for causing a head suspension to jump up from the ramp member 26. The reaction causes a head slider on the head suspension to collide against the surface of a magnetic recording disk. Accordingly, a larger separation acceleration provides a higher shock resistance.

In this case, the head suspension assembly 21 made of an aluminum alloy was set to have the equivalent mass of 1.68 mg at a section forward of the front end of the elastic bending section 44. On the other hand, the head suspension assembly made of stainless steel was set to have the equivalent mass of 3.05 mg at a section forward of the front end of the elastic bending section. An urging force or load of 2 g was applied to both the head suspension assemblies.

The calculation has revealed the separation acceleration of 656G in the head suspension assembly made of stainless steel. The calculation has likewise revealed the separation acceleration of 1,190G for the head suspension assembly 21 made of an aluminum alloy. It has been confirmed that the head suspension assembly 21 exhibits the separation acceleration approximately twice as large as that of the head suspension assembly made of stainless steel. In other words, it has been confirmed that an aluminum alloy serves to establish the enhanced shock resistance of the head suspension assembly.

A metallic protection layer may be formed at least on the front surface of the plate member 42 in the head suspension assembly 21. Electroless plating process may be employed to form the metallic protection film, for example. A Ni film may be employed as the metallic protection film, for example. Alternatively, a carbon protection film may be formed at least on the front surface of the plate member 42, for example. A DLC (Diamond Like Carbon) film may be employed as the carbon protection film, for example. The metallic protection film or the carbon protection film serves to enhance the hardness of the surfaces of the load tab 25 and the domed protrusion 52. Abrasion can thus be avoided between the ramp member 26 and the load tab 25 as well as between the domed protrusion 52 and the receiving plate 48. Generation of dust due to the abrasion is reliably avoided. Alternatively, the metallic protection film or carbon protection film may cover over the entire surface of the plate member 42.

Figure 5:
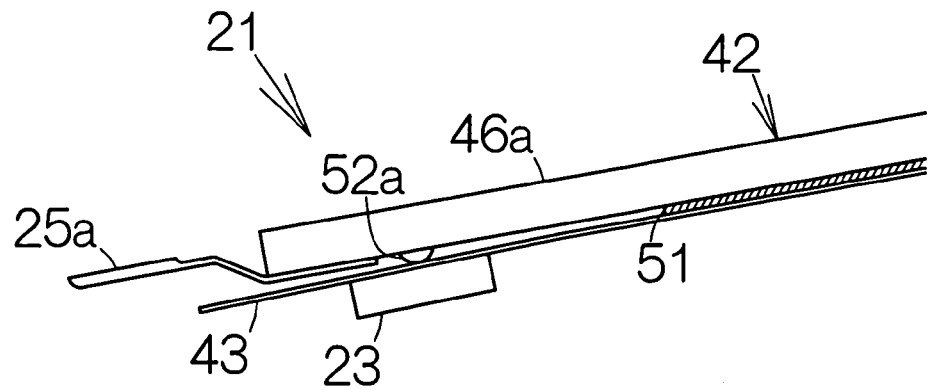
FIG. 5 is a partial enlarged side view schematically illustrating the structure of a head suspension assembly according to a modified embodiment of the present invention.

As shown in FIG. 5, a load tab 25a and a domed protrusion 52a made of stainless steel may be fixed to the plate member 42 in place of the aforementioned load tab 25 and the domed protrusion 52. In other words, the load tab 25a and the domed protrusion 52a may be separate from the main body 45. YAG laser welding or ultrasonic bonding may be employed to bond the load tab 25a and the domed protrusion 52a on the surface of the plate member 42, for example. Employment of stainless steel in this manner serves to avoid abrasion between the load tab 25a and the ramp member 26 as well as between the domed protrusion 52a and the receiving plate 48.

Figure 6:
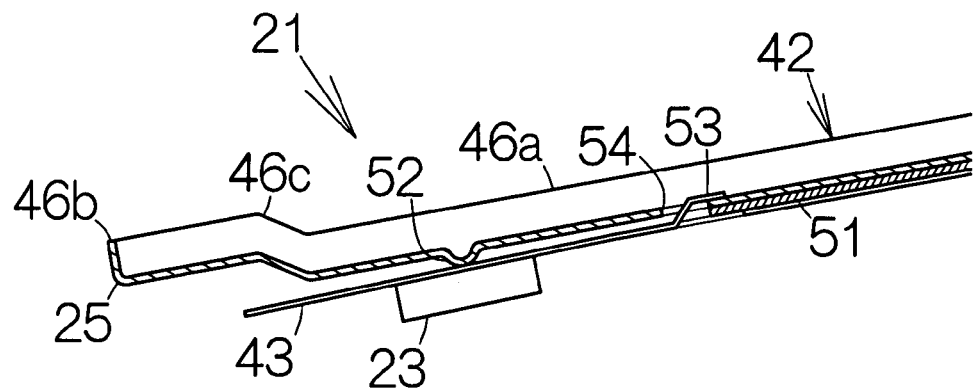
FIG. 6 is a partial enlarged sectional view schematically illustrating the structure of a head suspension assembly according to another modified embodiment of the present invention.
Figure 7:
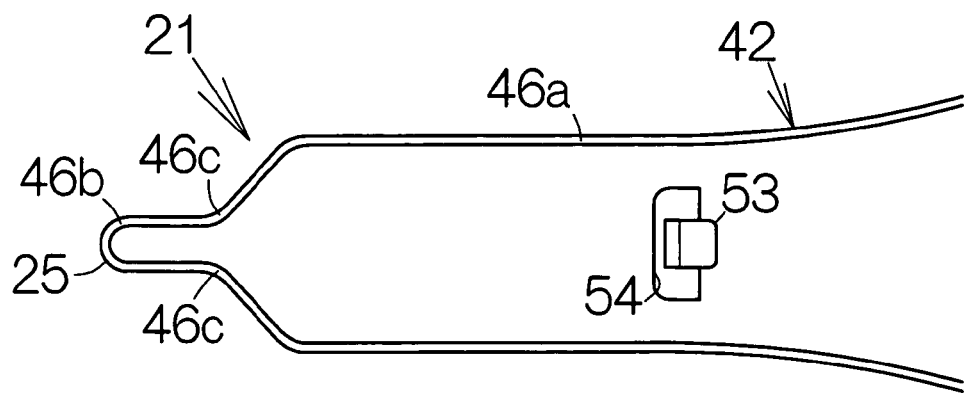
FIG. 7 is a partial enlarged plan view schematically illustrating the structure of the head suspension assembly of the another modified embodiment.

As shown in FIG. 6, a plate piece 53 may be formed continuous to the flexure 43. The plate piece 53 stands from the back surface of the flexure 43. The plate piece 53 may be located on the back surface of the flexure 43 at a position outside the viscoelastic member 51. The plate piece 53 may be integral to the flexure 43. The plate piece 53 bends to bring the tip end thereof in contact with the back surface of the plate member 42. Here, the tip end of the plate piece 53 may extend in parallel with the back surface of the plate member 42. Referring also to FIG. 7, the plate piece 53 is received in an opening 54 defined in the plate member 42. The tip end of the plate piece 53 is in this manner engaged with the back surface of the plate member 42.

While the head actuator 16 stays outside the magnetic recording disk 14, the load tab 25 moves upward along an inclined surface defined on the ramp member 26. An elastic or resilient force is accumulated in the head suspension 22 during the upward movement of the load tab 25. The load tab 25 is in this manner distanced from the surface of the magnetic recording disk 14. The upward movement of the load tab 25 serves to peel the plate member 42 off the flexure 43. The plate piece 53, however, reliably avoids separation between the plate member 42 and the viscoelastic member 51 as well as between the viscoelastic member 51 and the flexure 43. Damages to the head suspension assembly 21 are thus reliably avoided.

Figure 8:
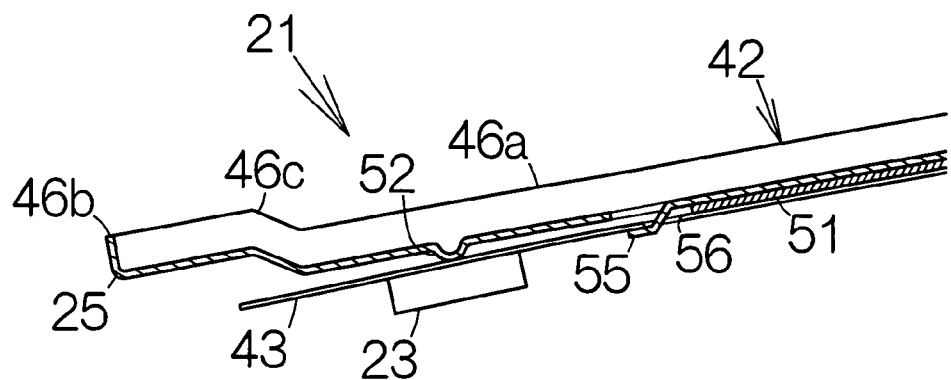
FIG. 8 is a partial enlarged sectional view schematically illustrating the structure of a head suspension assembly according to still another modified embodiment of the present invention.

Alternatively, a plate piece 55 may be formed at the front surface of the plate member 42, as shown in FIG. 8. The plate piece 55 bends to bring the tip end thereof in contact with the front surface of the flexure 43. Here, the tip end of the plate piece 55 may extend in parallel with the front surface of the flexure 43. The plate piece 55 may be integral to the plate member 42. The plate piece 55 is received in an opening 56 defined on the flexure 43. The tip end of the plate piece 55 is in this manner engaged with the front surface of the flexure 43. The plate piece 55 serves to reliably avoid separation between the plate member 42 and the viscoelastic member 51 as well as between the viscoelastic member 51 and the flexure 43 in the same manner as described above.

Figure 9:
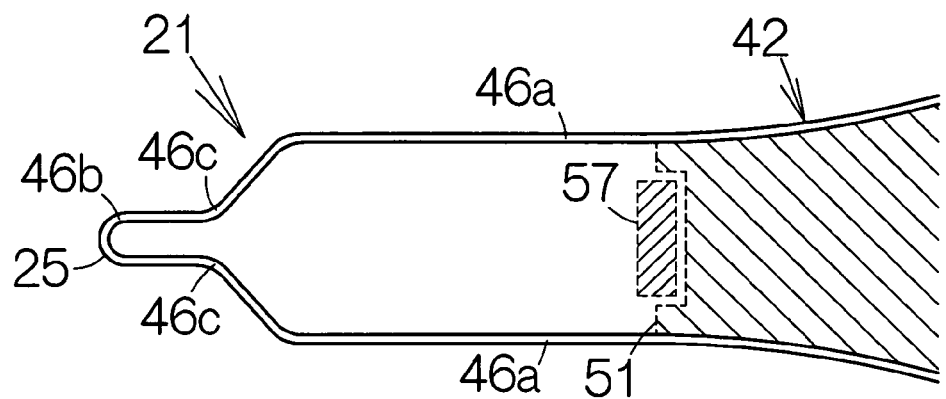
FIG. 9 is a partial enlarged plan view schematically illustrating the structure of a head suspension assembly according to still another modified embodiment of the present invention.
Figure 10:
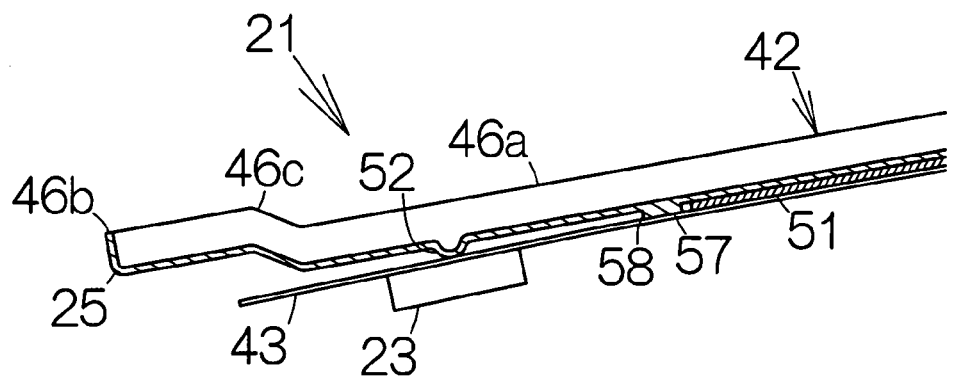
FIG. 10 is a partial enlarged sectional view schematically illustrating the structure of a head suspension assembly according to the still another modified embodiment.

As shown in FIG. 9, the flexure 43 may be bonded to the plate member 42 at a predetermined area 57. YAG laser welding or ultrasonic bonding may be employed in this case, for example. The predetermined area 57 is defined on the front surface of plate member 42 at a position outside the viscoelastic member 51. Referring also to FIG. 10, a pedestal 58 is formed on the front surface of the plate member 42 for establishing the predetermined area 57. The pedestal 58 may be integral to the plate member 42. The height of the pedestal 58 may correspond to the thickness of the viscoelastic member 51. The top surface of the pedestal 58 thus receives the back surface of the flexure 43. The bonding of the pedestal 58 and the flexure 43 serves to reliably avoid separation between the plate member 42 and the viscoelastic member 51 as well as between the viscoelastic member 51 and the flexure 43. Alternatively, the pedestal 58 may be formed on the back surface of the flexure 43 for receiving the front surface of the plate member 42.

The plate member 42 and the flexure 43 may be attached to a so-called unamount arm. The unamount arm is made of a stainless steel plate. The stainless steel plate defines the aforementioned actuator arm as conventionally known. A through hole is formed on the stainless steel plate. The support shaft 18 is received in the through hole when the unamount arm is mounted on the support shaft 18. Two or more of the unamount arms are mounted on the support shaft 18 for relative rotation. A spacer is interposed between the adjacent unamount arms around the support shaft 18. The unamount arms are often utilized in a small-sized hard disk drive classified as 1 inch type, 1.8 inches type, and the like, for example.

What is claimed is:

1. A suspension for a head slider, comprising:
   a flexure made of an elastic material, the flexure having a front surface and a back surface;
   a base plate having a front surface fixed to the back surface of the flexure, the base plate having rigidity;
   a plate member made of a metal material lighter than stainless steel, the plate member having a front surface fixed to the back surface of the flexure at a position spaced from the base plate so as to define an elastic bending section in the flexure between the base plate and the plate member; and
   a viscoelastic member interposed between the front surface of the plate member and the back surface of the flexure, the viscoelastic member bonding the plate member to the flexure to add rigidity to the flexure.

2. The suspension for a head slider according to claim 1, further comprising a plate piece standing from the back surface of the flexure, said plate piece extending along the front surface of the plate member, said plate piece received on a back surface of the plate member at a tip end of the plate piece.

3. The suspension for a head slider according to claim 1, further comprising a plate piece standing from the front surface of the plate member, said plate piece extending along a front surface of the flexure, said plate piece received on the front surface of the flexure at a tip end of the plate piece.

4. The suspension for a head slider according to claim 1, wherein the front surface of the plate member and the back surface of the flexure are bonded to each other outside the viscoelastic material based on ultrasonic bonding.

5. The suspension for a head slider according to claim 1, wherein the front surface of the plate member and the back surface of the flexure are bonded to each other outside the viscoelastic material based on welding.

6. The suspension for a head slider according to claim 1, further comprising a metallic protection film formed on the plate member.

7. The suspension for a head slider according to claim 1, further comprising a carbon protection film formed on the plate member.

8. The suspension for a head slider according to claim 1, further comprising a load tab made of stainless steel, said load tab being fixed to a tip end of the plate member.

9. The suspension for a head slider according to claim 1, further comprising a protrusion made of stainless steel, said protrusion being fixed to the front surface of the plate member so as to receive the back surface of the flexure.

* * * * *